Jan. 16, 1951   G. SUMMERS   2,538,483
PLASTIC CAP FOR BOLTS AND NUTS
Filed Nov. 15, 1945
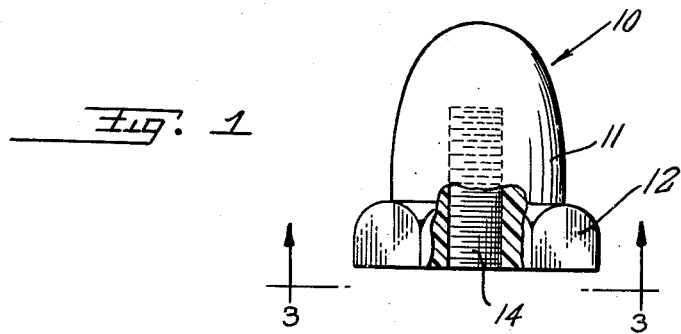
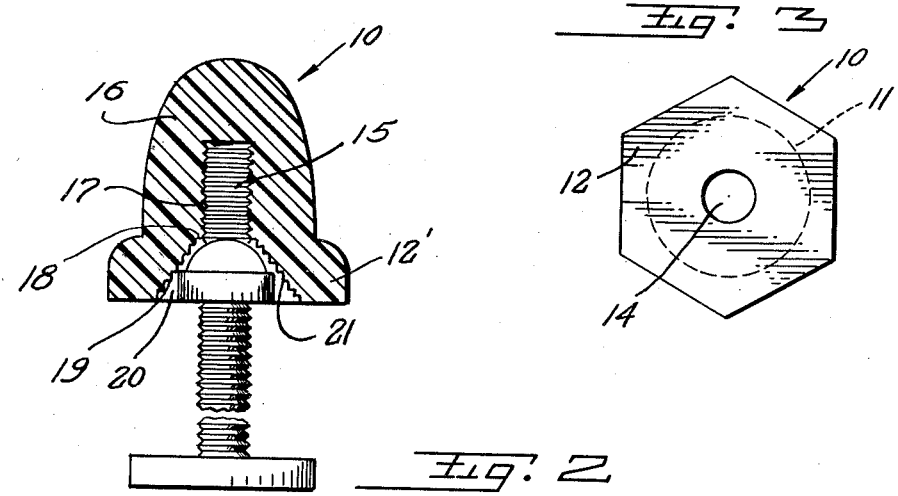
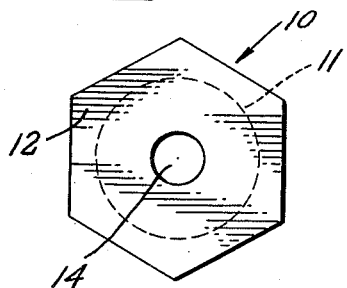
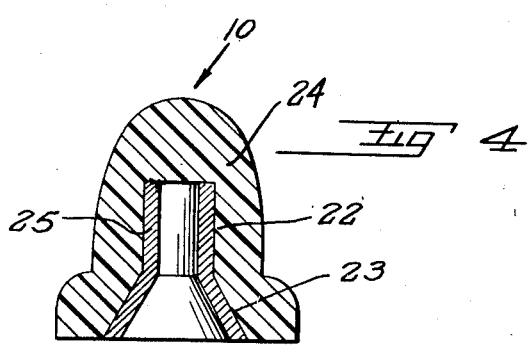
Inventor
George Summers
By Clarence A. O'Brien
and Harvey B. Jacobson
Attorneys Patented Jan. 16, 1951

2,538,483

UNITED STATES PATENT OFFICE 2,538,483

PLASTIC CAP FOR BOLTS AND NUTS

George Summers, Endicott, N. Y.

Application November 15, 1945, Serial No. 628,834

1 Claim. (Cl. 85—53)

My invention as described herein, and illustrated in the accompanying drawings, consists of a cap for bolts, nuts and the like, an object of which is to provide a plastic cover for the unsightly exposed ends of such hardware.

Another object of my invention is to provide a cap adapted to fit over or upon bolts, nuts, screws, etc. of various diameters.

A further object of this invention is to provide such a cap formed of a color to match bathroom or other fittings.

Another object of my invention is to provide a cap which may be held frictionally to a bolt end or other similar projection from a wall, etc.

Other features and advantages will become more readily apparent from the following description and the accompanying illustrative drawings in which:

Figure 1 is an elevational view partly in section of my cap,

Figure 2 is a sectional view of my device illustrating the application of a modification, Figure 3 is an end view of the cap, and Figure 4 is a sectional view of another modification.

While one embodiment of my invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of my device, which is to be limited only in accordance with the appended claim. And while I have stated the primary field of utility of my invention it remains obvious that it may be employed in any other capacity wherein it may be found applicable.

In the accompanying drawings, and in the following specification, the same reference characters are used to designate the same parts and elements throughout and in which 10, refers to my invention and 11, indicates the body portion of my plastic cap which is provided with an enlarged base 12. Into the center of the base 12, is bored a threaded aperture 14, whereby the device may be screwed directly upon the threaded end of a bolt. This cap, as are the other forms presently to be referred to, is of plastic material either clear lucite or the like or of colored material of a character to match and harmonize with certain fixtures.

In Figure 2 of the drawings I illustrate a variation of the device of Figure 1 and in which the bore 15, of cap 16, is straight at its inner end portion 17, but from the point 18, flares outwardly to a greatly enlarged end 19, forming a conic aperture 20, which is threaded and adapted to be attached to various sized nuts or bolts and secured by its threads 21.

In Figure 4, I show a still further modification in which the straight aperture 22, and flaring end 23, of the cap 24, is provided with an inner lining 25, of lead which may be forced into gripping contact with either a screw, screw-bolt, or the like for securing the cap thereto.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

A cap for bolt heads and nuts, comprising a domed member having an integral exteriorly nut-shaped flange on the base thereof, an axial bore in said member extending from said base through a portion of said member, the outer end portion of said bore being flared and dimensioned to fit over a bolt head or nut, the said member being constructed of commercial plastic softer than said bolt and nut to conform to the end of said bolt and nut and to seal thereon and to inhibit corrosion thereof, said bore, including the flared portion thereof, having a lining of soft metal to facilitate and improve said seal.

GEORGE SUMMERS.

REFERENCES CITED

The following references are of record in the file of this patent:

UNITED STATES PATENTS

| Number | Name | Date |
|---|---|---|
| 972,140 | Adam | Oct. 4, 1910 |
| 1,071,841 | Whitman | Sept. 2, 1913 |
| 1,254,514 | Lehmann | Jan. 22, 1918 |
| 1,256,409 | West | Feb. 12, 1918 |
| 1,490,336 | Lush | Apr. 15, 1924 |
| 1,756,167 | Avery | Apr. 29, 1930 |
| 1,787,154 | Hughes | Dec. 30, 1930 |
| 1,839,448 | Stresan | Jan. 5, 1932 |
| 1,909,941 | Finch | May 23, 1933 |
| 1,994,978 | Brown | Mar. 19, 1935 |
| 2,040,383 | Jasper | May 12, 1936 |
| 2,074,830 | Conner | Mar. 23, 1937 |
| 2,084,568 | White | June 22, 1937 |
| 2,401,824 | Gladden | June 11, 1946 |

FOREIGN PATENTS

| Number | Country | Date |
|---|---|---|
| 297,521 | Great Britain | Sept. 27, 1928 |
| 507,104 | Great Britain | June 9, 1939 |